June 18, 1957 W. C. SPEED 2,796,359

PRODUCTION OF MAGNETIC SOUND RECORDING TAPE

Filed July 5, 1952 2 Sheets-Sheet 1

INVENTOR
WILLIAM C. SPEED
BY
Pennie, Edmonds, Morton, Barrows & Taylor
ATTORNEYS June 18, 1957 W. C. SPEED 2,796,359

PRODUCTION OF MAGNETIC SOUND RECORDING TAPE

Filed July 5, 1952 2 Sheets-Sheet 2

INVENTOR
WILLIAM C. SPEED
BY
Pennie, Edmonds, Morton, Barrows & Taylor
ATTORNEYS United States Patent Office 2,796,359

Patented June 18, 1957

2,796,359

PRODUCTION OF MAGNETIC SOUND RECORDING TAPE

William C. Speed, Pound Ridge, N. Y., assignor to Audio Devices, Inc., New York, N. Y., a corporation of New York Application July 5, 1952, Serial No. 297,245

2 Claims. (Cl. 117—62)

This invention relates to the production of magnetic sound recording tape and has for its object improvements in the method of and apparatus for producing such tape as well as in the tape itself as an article of manufacture.

It is customary in the production of magnetic sound recording tape to pass a long and narrow tape base from a roll unwinding zone through a magnetic coating zone and a magnetic coat drying zone to a roll winding zone. After leaving the unwinding zone, the tape base is passed sometimes through an adhesive coating zone and an adhesive coat partial drying zone before reaching the magnetic coating zone.

The tape base usually is paper or plastic, such as cellulose acetate. It varies in width, depending on the nature and quality of the tape base stock, the apparatus available, etc. Tape base about 10″ wide is being used at the present time in the practice of this invention.

Various adhesive liquids may be used in the adhesive precoating step, the object of which is to condition one side of the tape base for receiving an adherent coating of the magnetic material. Among the adhesive liquids that may be employed are a copolymer of polybutadiene with acrylonitrile, the methyl esters of acrylic acid, etc.

The magnetic coating is formed of a dispersion of finely divided magnetic particles, usually magnetic oxide of iron, synthetically made, in a liquid vehicle formed of one or more binders, such as synthetic rubber, vinyl plastic, hard resin, etc. and solvents, such as toluol, isopropyl acetate, etc.

A very thin adhesive precoat, if used, is spread on one side of the tape base and is partially dried so that it will take more readily a coating of the magnetic material. A magnetic coating of predetermined optimum thickness is spread over the partially dried adhesive precoat. The magnetic coating is carefully dried to volatilize the solvents in the dispersion and to leave a pliable residue of magnetic materials and binder.

The magnetic particles may, in the alternative, be mixed with a thermoplastic material, preferably in powdered form. The mixture is then heated and flowed onto a surface of the tape, providing a coating in which the magnetic particles are uniformly distributed or dispersed in the plastic material.

The tape base in the resulting roll is processed in various ways. Thus the magnetic coating may be rolled and polished so that it will be much less abrasive to the metal and other parts it may engage subsequently on sound recording and sound reproducing machines. The processed tape base is slit into a plurality of pieces of tape of desired lengths and widths and wound into separate rolls for sound recording.

While magnetic sound recording tape of excellent quality is being produced, room for improvement exists in certain respects. This is especially true as regards "output" or "sensitivity," "background noise," etc. My investigations have led to the discovery that tape may be produced that is greatly improved in those respects.

I have found that such highly desired improved results may be obtained when the magnetic particles are suitably oriented or aligned in the magnetic coating. They should be so oriented that their magnetic axes lie in the general direction of travel of the tape, that is, lengthwise of the tape. The particles will thus in general be parallel to each other in that direction, provided that their magnetic axes coincide with their longitudinal axes. The magnetic axis here referred to is somtimes known as the "easy" magnetic axis.

As at present made, the magnetic particles, usually of synthetic magnetic oxide of iron (gamma form of $Fe_2O_3$), occur in various shapes and sizes peculiar to this material. There is a tendency, also, for the particles to unite in very small agglomerates; although it is customary to try to break up such agglomerates; for example, by grinding the dispersion of magnetic material in a ball-mill just prior to being spread on the tape base.

While the magnetic particles may be oriented mechanically, as by shaking or vibrating, and passing the freshly coated tape base in the proper direction, I prefer to accomplish the aligning magnetically. To this end, the freshly coated tape base is passed through a suitable magnetizing zone after it receives the magnetic coating and before the coating is finally dried or solidified. In other words, the orientation of the magnetic particles in the coating takes place while the coating is still soft so that they may be turned readily in any direction necessary to effect their desired orientation.

When the dispersion is placed on the tape base, the magnetic particles lie in what may be termed hit-or-miss or random positions. That is to say, they do not fall into a uniform pattern so far as their alignment is concerned. They may point in all of the numerous directions of a compass while in all kinds of planes. Their positions may be said to be unordered or mixed-up, or random. I have found that when the magnetic particles, or at least the magnetic axes thereof, are more or less uniformly aligned lengthwise of the tape base, the superior sound recording and reproducing results referred to will be obtained.

As stated, the particles are oriented after the coating is applied and before it is finally dried or permitted to solidify. The particles should be maintained in their oriented positions while the drying-out operation continues. As solvent is volatilized, the coating becomes more and more viscous, and as this occurs it becomes more and more difficult for the particles to return to their former unordered positions. They are forced to remain, in other words, in their ordered oriented positions. When, therefore, the tape base is finally dried, or solidified, the particles are fixed or locked in their aligned, substantially parallel, order.

These and other advantages of the invention will be better understood by referring to the accompanying drawings, taken in conjunction with the following description, in which.

Figure 1:
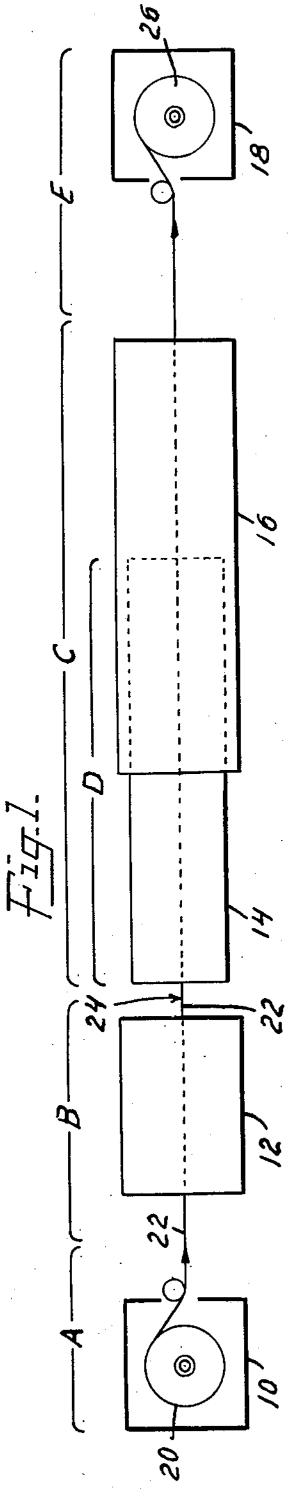
Fig. 1 is a diagrammatic representation, in flow sheet style, of an apparatus illustrative of a practice of the invention.

In terms of method, the arrangement shown in Fig. 1 is in the form of roll-unwinding zone A, magnetic coating zone B, magnetizing zone C, magnetic coat drying zone D, and roll-winding zone E. In terms of apparatus, the arrangement includes a roll-unwinding device 10, a magnetic coating device 12, a magnetizing device 14, a magnetic coat drying machine 16, and a roll-winding machine 18.

A roll 20 of tape base 22 is mounted on a spindle of unwinding device 10 in unwinding zone A. The tape base is pulled from the roll toward and through magnetic coating device 12 where one side thereof receives a layer 24 of the magnetic dispersion, the layer being of predetermined uniform thickness so far as possible.

As indicated above, an adhesive precoating and a partial drying operation may precede the magnetic coating operation, if desired. In such case appropriate devices for the purpose are disposed between the unwinding device and the magnetic coating device in the path of travel of the tape base.

Still referring to Fig. 1, it will be noted that drying zone C is shown as starting at the forward end of magnetizing zone 12 rather than at the rearward end of drying machine 16. This is for the reason that drying of the magnetic coating begins as soon as it is deposited on the tape base and is exposed to room air. The tape base quickly passes into the drying machine 16 where the coating is dried further with artificially produced heat, such as by heated air, radiant heat from electric light bulbs, infrared lamps, etc.

I have found that the magnetizing device, in zone D, may be located between the magnetic coating device and the drying machine, or in the rearward end of the drying machine, or partly in and partly out of the rearward portion of the drying machine adjacent the magnetic coating device, that is, at some place along the path of travel of the coated base where the viscosity of the vehicle of the coating composition on the tape base still is sufficiently low to permit ready orientation therein of the finely-divided particles of magnetic oxide of iron. In current practice the magnetizing device is located between the magnetic coating device and the drying machine, being in fact, only a few inches from the feed hopper of the coating device, or even under the feed hopper, so that orientation of the magnetic particles begins promptly after the magnetic coating is deposited on the tape base. For convenience, therefor, the magnetizing device is shown in Fig. 1 as extending from near the coating machine to and into the drying machine, it being understood that some latitude is permitted in the placement of the magnetizing device.

The magnetically treated tape base proceeds through the drying machine 16 where the coating is thoroughly dried and its magnetic particles are fixed or locked in the binder of the coating in their oriented or locked positions.

The dried tape base passes into winding zone E where it is wound into a roll 26. This device is power-driven under accurate speed control so that the dried tape base is taken up in the roll as fast as the dried tape base leaves the drying machine, which also is power-driven.

Figures 2, 3, 4:
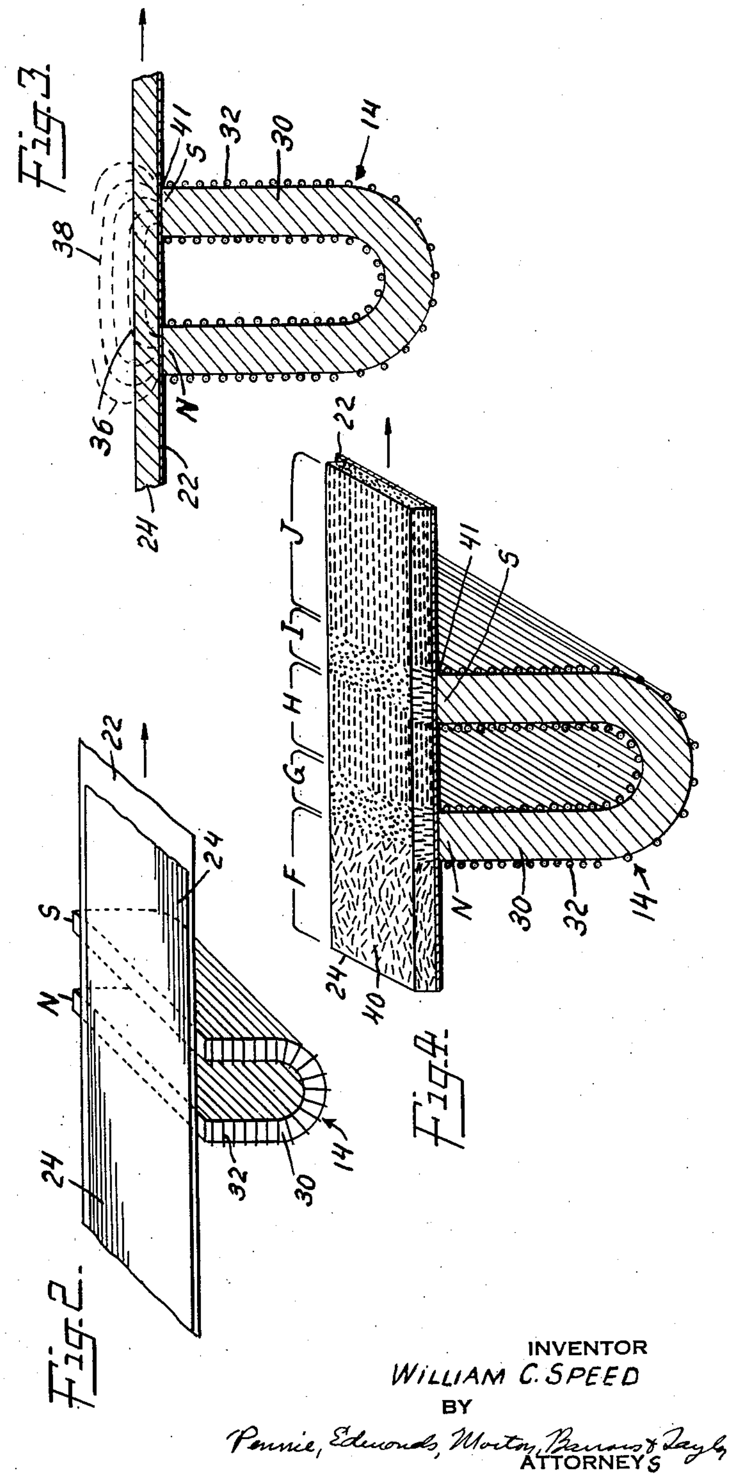
Fig. 2 is a perspective view of a magnetizing device in association with magnetic coated tape base.
Fig. 3 is an enlarged cross-sectional view of a similar arrangement illustrating the tape base in the magnetic field of the magnetizing device.
Fig. 4 is a similar view illustrating the effect of the magnetic field on the magnetic particles in the coating.

Fig. 2 is a perspective diagrammatic view showing the freshly coated tape base passing over one form of magnetizing device, in the form of a U-shaped electro-magnet 30 of conventional type on which is wound a coil 32 of wire electrically energized by a suitable source of current, not shown. The magnet has the usual north pole N and south pole S. It will be noted, and this is important, that the poles extend transversely across the path of travel of the tape base, preferably at right-angles thereto. The magnet is located immediately adjacent the uncoated or underside of the tape base. Thus there will be no chance for the magnetic coating to touch the poles of the magnet. Their cleanliness is thus assured.

It will be noted further (Fig. 2) that the poles of the magnet extend at both ends beyond the sides or edge portions of the tape base; and that the tape base is wider than the magnetic coating, leaving uncoated edge portions which confine the coating material wholly to the coated side of the tape base.

Although a single magnet is shown in each of the figures, it will be understood that a plurality of them may be used. They may be spaced at intervals along the path of travel of the tape base where the coating is still soft and its magnetic particles may be turned for the desired orientation or aligning effect.

Fig. 3 is an enlarged sectional view in which I have attempted to illustrate diagrammatically the coated tape base in a magnetic field or flux 36 created by the magnetic device. Because the device is transverse of the coated tape base, the lines of force 38 from the north to the south pole are generally parallel and in the direction of travel, that is, lengthwise of the tape base. Also the lines passing through the magnetic coating are essentially straight, and it is here that the intensity is the greatest.

In Fig. 4 I have tried to show, also diagrammatically, how magnetic particles and agglomerates 40 in coating 24 react to those lines of force in the magnetic field. This explanation is based on experimental evidence thus far attained. As the tape base approaches the magnetizing device, the magnetic particles are in their disarranged, unordered, random positions, as shown in zone F. As the particles approach the first pole of the magnet, in zone G, they turn and tend to assume an upright position in the coating. As the upright particles are carried toward the second pole in zone H, they are constrained to lie generally parallel to each other lengthwise of the tape base (assuming their magnetic and longitudinal axes to coincide). This cycle is repeated in part as the particles approach the second pole in zone I. That is, they tend to assume an upright position, but drop into an oriented horizontal position lengthwise of the tape base in zone J, as they leave the second pole.

Each magnetic particle tends to become a separate magnet with its own north pole and south pole at each end of its magnetic axis. While the cycle they go through seems unavoidable, each repetition is made easier, while the coating is still soft, by the fact that when the particles pass the first pole they are no longer in their original disarranged positions. From then on, the particles tend to rise and fall in orderly fashion at each succeeding pole until they leave the last pole of the magnetizing device in oriented arrangement. Since the tape base is moved rapidly through the drying zone, the oriented particles are quickly set or frozen in their aligned positions, parallel to and running lengthwise of the tape base. The aligning effect, which may be likened to a combing operation, appears to occur to the maximum extent at the last trailing edge 41 of the magnet, on which line the magnetic force on the particles is very strong. As the particles are carried away from this last pole, they assume substantially parallel positions because one end of the magnetic axis, viz., a pole of each particle, tends to cling to the trailing edge of the magnet pole, thus causing the particle to lie out flat, with its magnetic axis parallel to the direction of motion of the tape base. This tendency to cling to the edge of the magnet pole is so great, in fact, that if the magnetic field is too strong, the coating may be stripped from the base. Hence it is important to adjust the field strength to a value sufficient to align the particles but insufficient to overcome the adhesive force of the coating.

Figure 5:
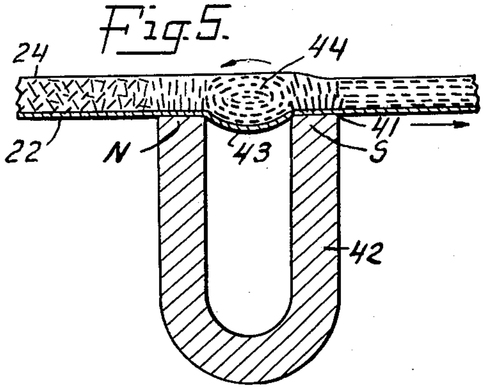
Fig. 5 is a cross-sectional view of a modification of the invention which incorporates a permanent magnet, and in which the tape is permitted to sag, forming a shallow loop between the pole pieces.

The embodiment illustrated in Fig. 5 includes a permanent magnet 42 of U-shape, and is similar to that illustrated in Fig. 4 except that the magnet of Fig. 4 is represented as an electromagnet. Here, however, a shallow loop 43 is formed in the tape between the two poles of the magnet. A similar loop could be formed between any two adjacent poles shown in the other figures. This can be accomplished by appropriate control of the feeding and take-up reels. Since, as above described, the greatest pull on the particles appears to occur at the trailing edge 41 of the magnet, viz., the line along which the tape leaves the magnet pole, the softened mixture 44 of binder and magnetic particles trapped in the loop acquires a rolling motion. If, in this process, an excess of material tends to collect in the loop it will flow off the edges of the tape. It has been found that this rolling motion imparts additional mobility to the particles and in some instances enhances the alignment or orientation thereof when they finally pass the trailing edge 41 of the last magnet pole. Alternatively, the loop may be formed at any other suitable point in the path, for example, under the feed hopper in the coating device 12 (Fig. 1).

Figure 6:
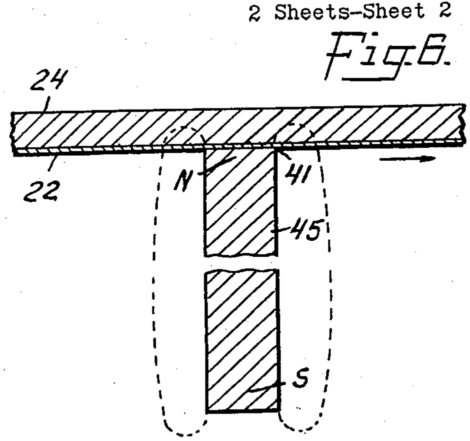
Fig. 6 illustrates a further modification of the invention in which one end of a bar magnet is positioned adjacent the tape.
Figure 7:
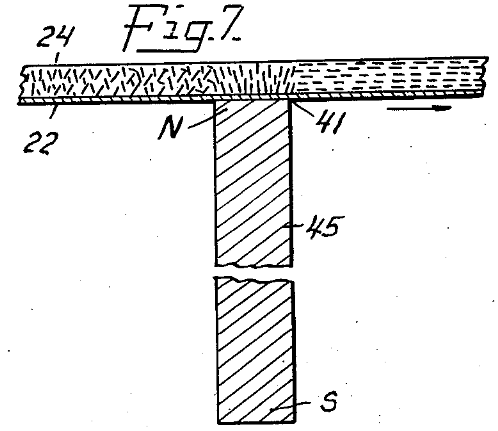
Fig. 7 illustrates in cross-section the effect on the magnetic particles in passing the bar magnet of Figure 6.

The embodiment illustrated in Fig. 6 comprises a permanent magnet 45 of the bar type, in many cases satisfactory for the purpose of the invention. As before, the greatest combing or orienting effect occurs at the trailing edge 41, because the particles tend to cling to or near that edge as they are carried away by the moving tape, Fig. 7. Since it is only one pole of the magnetic axis of a given particle which tends to cling to this edge, the particles are thus oriented with their magnetic axes lying substantially in the same direction. The plan view of Fig. 8 illustrates this effect as viewed from above the tape.

Figure 9:
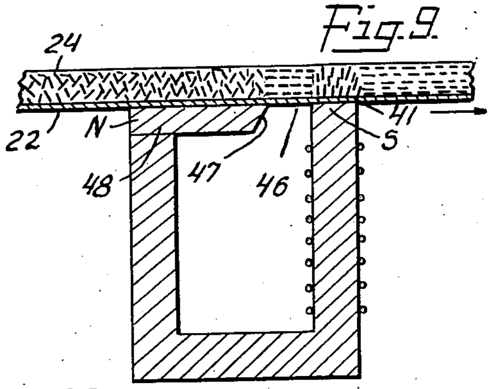
Fig. 9 is a cross-sectional view of a preferred form of magnet structure in accordance with the invention.
Figures 8, 10:
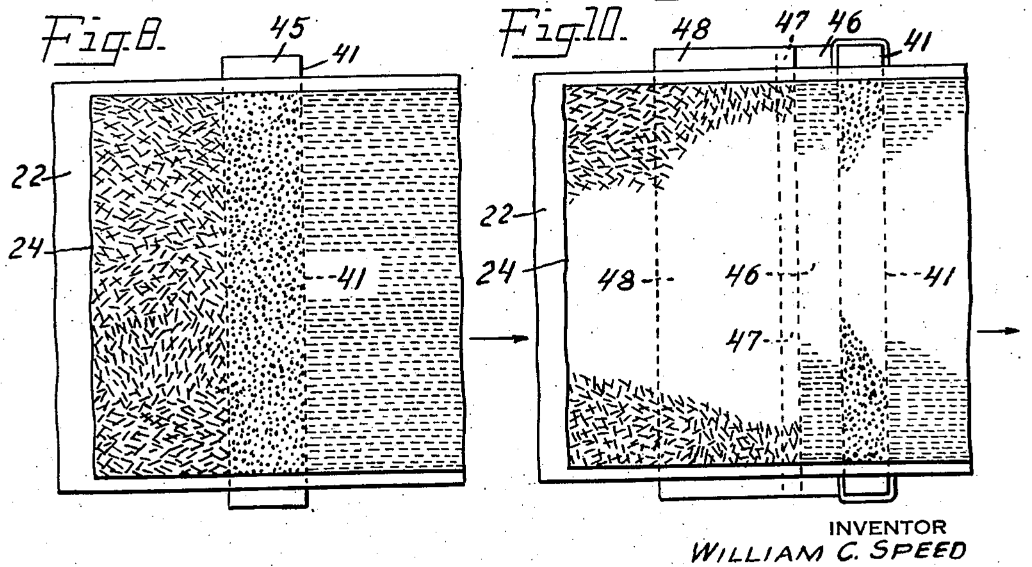
Fig. 8 is a plan view corresponding to the sectional view of Fig. 7, showing the effect of the magnetic field of Fig. 6 on the magnetic particles in the coating.
Fig. 10 is a plan view of the tape and magnet structure of Fig. 9 showing the effect of the magnetic field on the magnetic particles in the coating.

Figs. 9 and 10 show a presently preferred form of magnet which has been found to be especially effective in the manufacture of magnetic tape according to the invention. Here, the magnet may be of the electromagnetic type, as shown, or of permanent magnet type, if desired. The magnet in this case is of generally rectangular form, comprising a core closed except for a short gap 46. This gap comprises the space between the end of magnetic pole S and the chamfered end 47 of leg 48. The magnetic flux within and in the vicinity of such a gap will be highly concentrated. As before, the most effective orientation of the magnetic particles will occur at the trailing edge 41 of the magnetic pole, S.

The subject of magnetism is complex, one that may itself be said to be in flux because the theories about it are revised from time to time as new factual data are found by later investigators. That I do not fully understand the phenomena that take place is readily admitted. Fortunately, it is not necessary that one fully understand what takes place. I do know, however, that the pre-stressing practice as herein described, operates successfully and gives markedly improved results so far as such characteristics as output, sensitivity, background-noise, etc. are concerned.

This is amply borne out when sound is recorded on a piece of the new tape and is reproduced. The tape accepts magnetic sound impulses more readily, viz., requires less signal current. Its decibel rating increases over a similar tape made in the conventional manner. Stated another way, a tape processed according to the invention may then contain less magnetic particles, such as magnetic oxide of iron, than the conventional tape to provide the same output level, resulting in considerable saving in cost.

In this connection, it should be noted that if the poles of the magnetic device are placed lengthwise of the tape base and the randomly located magnetic particles are stressed or oriented transversely of the tape base, the desired results are not obtained. The ultimate tape is not only greatly inferior to that produced according to the invention, as above described, it is greatly inferior to conventional tape. It is, in fact, so inferior as to be made commercially useless for the described purpose, according to present-day standards.

It will be recalled that in the practice of the invention, the poles of the magnet are located transversely of the tape base and that this is true also of the poles of the heads later to be used for recording and reproducing sound. The oriented magnetic particles are aligned for actual use, thus inhibiting any tendency for them to "fight" or cancel the effect of each other during sound recording and reproducing.

During the course of my investigations, magnetizing devices of various forms under various operating conditions have been employed. Magnets that are energized during the orientation step are preferred because they provide readily the strength of field necessary to do the work. A sufficiently strong fixed magnet would be satisfactory. Magnets of two or more poles, and one or more of the magnets have been used successfully. Three-pole or E magnets, for example, have been used. It has been found that direct or unidirecttional current is preferable for energizing the electromagnets. However, this is not essential, because the magnets may be energized with alternating current of frequency (or with rectified A. C. of pulse frequency) suitably related to the dimensions of the magnetic gap, the size of the particles and the rate of travel of the tape. An alternating current of five amperes at twenty volts, rectified to provide direct current, has been used successfully.

It will be clear to those skilled in this art that the practice of the invention lends itself readily to a number of useful modifications in method, apparatus and product. For example, the tape according to the invention may take various equivalent forms. The tape base is not limited to the materials previously mentioned because it may comprise any suitable material, including many non-magnetic metals. Also, the "coating" carrying the magnetic particles may be thick enough itself to constitute the tape, thus eliminating the base material.

I claim:

1. In the method of producing magnetic recording tape wherein a long narrow non-magnetic tape base from a roll in an unwinding zone is passed through a magnetic coating zone, where a very thin layer of a dispersion of finely divided particles of magnetic oxide of iron in a liquid vehicle formed of a binder and a solvent is deposited on one side of the tape base, and a magnetic coat-drying zone, and is wound into a roll in a winding zone, the improvement which comprises passing the coated tape base in a generally horizontal direction through a magnetic field having its source at the uncoated transverse side of the non-magnetic tape base after it is freshly coated with the liquid dispersion of magnetic oxide of iron particles and before the coating is finally dried, the magnetic field having its lines of force in a direction generally longitudinal of the tape base and being sufficiently strong to orient the iron oxide particles in the soft coating so that their magnetic axes are in a direction generally lengthwise of the tape base, the iron oxide particles being oriented in a plurality of superposed levels within the depth of the soft coating, evaporating liquid from the binder-solvent in the coating to harden the same partially while the iron oxide particles pass through the magnetic field in a smooth path of travel to place the oriented iron oxide particles in a substantially quiescent state relatively to each other and hence not to disturb their oriented position, maintaining the iron oxide particles in their quiescent oriented position while the coating dries and hardens sufficiently to fix the particles in said position, and completing the drying of the partially hardened coating while the iron oxide particles are so oriented, the rate of winding the coated tape base and the rate of unwinding the uncoated tape base being controlled to regulate the tension in the tape base between the unwinding and winding zones to permit the formation of an intervening loop of the tape base, and the advancing freshly coated tape base dipping in a shallow, depending and continuously forming, loop as it passes through the magnetic field so that the magnetic particles trapped in the loop acquire a rolling motion to facilitate their orientation.

2. In the method of producing magnetic recording tape wherein a long narrow non-magnetic tape base from a roll in an unwinding zone is passed through a magnetic coating zone, where a very thin layer of a dispersion of finely divided particles of magnetic oxide of iron in a liquid vehicle formed of a binder and a solvent is deposited on one side of the tape base, and a magnetic coat-drying zone, and is wound into a roll in a winding zone, the improvement which comprises passing the coated tape base in a generally horizontal direction through a magnetic field having its source at the uncoated transverse side of the non-magnetic tape base after it is freshly coated with the liquid dispersion of magnetic oxide of iron particles and before the coating is finally dried, the magnetic field having its lines of force in a direction generally longitudinal of the tape base and being sufficiently strong to orient the iron oxide particles in the soft coating so that their magnetic axes are in a direction generally lengthwise of the tape base, the iron oxide particles being oriented in a plurality of superposed levels within the depth of the soft coating, evaporating liquid from the binder-solvent in the coating to harden the same partially while the iron oxide particles pass through the magnetic field and are being oriented, passing the coated tape base away from the magnetic field in a smooth path of travel to place the oriented iron oxide particles in a substantially quiescent state relatively to each other and hence not to disturb their oriented position, maintaining the iron oxide particles in their quiescent oriented position while the coating dries and hardens sufficiently to fix the particles in said position, and completing the drying of the partially hardened coating while the iron oxide particles are so oriented, the rate of winding the coated tape base and the rate of unwinding the uncoated tape base being controlled to regulate the tension in the tape base between the unwinding and winding zones to permit the formation of an intervening loop of the tape base; the advancing freshly coated tape base dipping in a shallow, depending and continuously forming, loop as it passes through the magnetic field; and the magnetic field being caused to give the iron oxide particles in the soft coating temporarily trapped in the loop a rolling motion to facilitate their orientation in the desired direction.

References Cited in the file of this patent

UNITED STATES PATENTS

| | | |
|---|---|---|
| 1,949,840 | Languepin | Mar. 6, 1934 |
| 2,418,479 | Pratt | Apr. 8, 1947 |
| 2,643,130 | Kornei | June 23, 1953 |

FOREIGN PATENTS

| | | |
|---|---|---|
| 459,884 | Great Britain | Jan. 18, 1937 |